3,663,481
PHENOL-FORMALDEHYDE ADHESIVE RESIN CONTAINING HYDROXYETHYL CELLULOSE
Harlan G. Freeman, Gene F. Baxter, and John T. Howell, Seattle, Wash., assignors to Weyerhaeuser Company, Tacoma, Wash.
No Drawing. Filed Apr. 20, 1970, Ser. No. 30,261
Int. Cl. C08b 21/32; C08g 37/18
U.S. Cl. 260—14                    10 Claims

ABSTRACT OF THE DISCLOSURE

Improved phenol-formaldehyde adhesive resins suitable for plywood manufacture are obtained by premixing with aqueous formaldehyde about 0.3–6.0 weight percent of hydroxyethyl cellulose based on formaldehyde and thereafter reacting the hydroxyethyl cellulose formaldehyde solution with phenol in the presence of alkali to obtain a thermosetting phenol-formaldehyde resole resin. When formulated as a plywood glue, this modified phenol-formaldehyde resin provides an adhesive glue with enhanced tolerance to a wide variety of wood and production variables including assembly time.

BACKGROUND

Phenolic resole resins prepared by the alkaline condensation of phenol and aldehydes have long been used in plywood adhesives. Redfern U.S. Re. 23.347 and Van Epps U.S. 2,360,376 disclose the basic technology of the alkaline condensed resole resins employed as plywood adhesives. Booty U.S. 2,462,253 adds a water-soluble methyl cellulose to the phenol-formaldehyde-alkali reactants as a thickening agents to improve the storage stability of the adhesive resin. Barrentine U.S. 2,862,97 uses as a thickener an alkali-soluble hydroxyethyl cellulose added during the resin preparation. Carstensen U.S. 3,450,651 is typical of more recent developments.

In spite of significant advances in resin technology, changes in wood stocks and production methods require adhesive tolerant to an ever wider variety of process variables. Normally plywood veneers are coated with adhesive and assembled into multi-ply sheets which are stacked at ambient temperature until a full hot press load is prepared, an operation that may require a half hour or more. During this closed assembly time, the wood absorbs water from the adhesive glue. With a highly absorbent softwood such as the spring wood portion of Southern yellow pine, rapid dehydration of the glue line occurs with resultant inadequate glue flow and penetration during the subsequent hot press cure cycle. With a less absorptive wood, like Douglas fir, an aqueous glue line dries more slowly and too much flow and penetration may occur during hot pressing. Either condition causes substandard plywood.

Thus, a good plywood adhesive must be tolerant not only of the variable wood absorptivity, but must also be capable of producing specification grade plywood overa broad range of assembly time. Other significant process variables include veneer moisture content and temperature, the temperature and humidity of the assembly area, the glue spread, the press precure time, etc.

STATEMENT OF THE INVENTION

It has now been discovered that a plywood adhesive with increased tolerance to a wide variety of wood species and process conditions can be achieved by premixing aqueous formaldehyde with about 0.3–6.0 weight percent hydroxyethyl cellulose in the absence of alkali and thereafter reacting the hydroxyethyl cellulose formaldehyde solution with phenol in the presence of alkali to obtain an improved thermosetting phenol-formaldehyde adhesive resin suitable for a plywood glue.

The premixing of the hydroxyethyl cellulose and formaldehyde in the absence of caustic and phenol is critical to the improved process. A rapid reaction of the hydroxyethyl cellulose and formaldehyde occurs to form a complex or adduct which in the subsequent base-catalyzed reaction with phenol provides a significant increase in higher molecular weight species in the adhesive resole resin. These higher molecular weight species are present in collodial dispersion and appear to give the plywood glue prepared from the resole resin its improved tolerance to wood species and assembly process variations.

GENERAL DESCRIPTION

Essential to the improved resole adhesive resin is the hydroxyethyl cellulose (HEC) premixed with the formaldehyde prior to addition of phenol and caustic. Both alkali- and water-soluble hydroxyethyl cellulose having a hydroxyethyl molar substitution (MS) of about 0.3–4.0 can be used. Suitable alkali-soluble hydroxyethyl cellulose with a hydroxyethyl MS of about 0.3–0.7 and water-soluble hydroxyethyl cellulose with a hydroxyethyl MS of about 1.2–4.0 are commercially available in several viscosity or molecular weight grades. Particularly suitable is a water-soluble hydroxyethyl cellulose having a 2 weight percent aqueous solution viscosity of about 40–4000 cps. at 25° C. which dissolves readily in aqueous formaldehyde without imparting too high a viscosity to the resole resin mixture.

In practice, improved adhesive glues are obtained from resole adhesives prepared with about 0.3–6.0 weight percent HEC, based on formaldehyde, premixed with the formaldehyde in the absence of alkali. Optimum results are normally obtained with about 1.5–3.0 weight percent HEC based on formaldehyde.

As the formaldehyde reactant, a 30–60% aqueous formaldehyde solution is most suitable, but other formaldehyde sources including paraformaldehyde can be used provided the hydroxyethyl cellulose and formaldehyde are mixed together in aqueous solution prior to addition of phenol and alkali. Formation of the HEC-formaldehyde complex or adduct occurs rapidly in 30–60% aqueous formaldehyde at room temperature and the phenol and caustic can be added as soon as the hydroxyethyl cellulose is dissolved.

As in conventional resole adhesives, phenol is generally used alone. However, it can also be used in mixtures with up to about 20 weight percent of other phenols including cresol, xylenol, and polyphenylphenol.

The improved resole adhesive resin is obtained by reacting the premixed HEC-formaldehyde solution with phenol and caustic in the normal manner used in preparing phenol-formaldehyde resole adhesives. Thus, the improved resin is prepared by using reactant mole ratios of formaldehyde/alkali/phenol of about 1.5–2.5/0.1–0.7/1.0 and heating the reactant mixture at an elevated temperature, preferably about 70°–100° C., until an adhesive resin of desired viscosity is obtained. Also the alkali, preferably a strong base such as sodium or potassium hydroxide, is added advantageously in two or more increments at predetermined reaction stages. Particularly good results are obtained using the general procedure of Booty U.S. 2,462,253 with about 1.7–2.0 moles of HEC-formaldehyde solution per mole phenol.

The resulting phenol-formaldehyde resin is used in a standard plywood glue formulation. Finely divided, inert fillers such as slate flour, wood flour, starch, clay, chalk, silicates, oat hulls, corn cobs, etc. are normally added along with a small amount of antifoam agent, such as diesel oil, and sufficient water to give a spreadable liquid glue formulation containing about 20–50 weight percent phenol-formaldehyde adhesive resin solids and about 35–65 weight percent total solids. This glue is then applied to wood veneers by standard glue coating techniques using a spreader, felt roll, curtain coater, or even spray coating techniques. With the improved phenol-formaldehyde adhesive resins, excellent wood adhesion is achieved at spread rates of about 50–90 lbs./Mft.$^2$ of double glue line. The optimum glue line spread depends on the specific veneer. With Douglas fir a spread of about 60–65 lbs./Mft.$^2$ is excellent, while Southern yellow pine requires about 65–70 lbs./Mft.$^2$ for best results.

The following examples illustrate further the present invention. Unless otherwise stated, all parts and percentages are by weight.

EXAMPLE 1

Phenol-formaldehyde adhesive resins

A series of phenol-formaldehyde adhesive resins was prepared using the following standard resole resin formula and the incremental caustic addition procedure of Booty U.S. Pat. 2,462,253. Resin advancement at the end of each stage was measured using standard Gardner-Holdt bubble tubes at 25° C. (ASTM Method D–1545–63).

FORMULA

|  | Parts |  |
|---|---|---|
| 46.5% formaldehyde [1] | 348.7 | (5.40 moles). |
| Hydroxyethyl cellulose (HEC) | 3.0 |  |
| 90.0% phenol [1] | 313.1 | (3.00 moles). |
| First water | 88.7 |  |
| First 50% NaOH [1] | 25.4 | (0.32 mole). |
| Antifoam [2] | 0.2 |  |
| Second 50% NaOH [1] | 9.0 | (0.11 mole). |
| Second water | 169.3 |  |
| Third 50% NaOH [1] | 42.6 | (0.53 mole). |
| Total | 1,000.0 |  |

[1] Adjusted for actual concentration in first or second water addition.
[2] Tret-O-Lite antifoam (Petrolite Corp., St. Louis, Missouri).

NOTE.—Mole ratios: 1.80 HCHO/0.32 NaOH/1.0 phenol, 1.85 wt. percent HEC based on formaldehyde.

(A) Control resin without hydroxyethyl cellulose (HEC)

(1) The formaldehyde, phenol, and first water were mixed and the temperature adjusted to 25° C. Then the first NaOH was added and the temperature increased to 85° C. at a uniform rate in 100 minutes. Then the antifoam was added and the mixture held at 85° C. for 110 minutes to a Stage 1 viscosity at 25° C. of BC (70 cs.).

(2) The resin mixture was cooled to 80° C. and held at 80° C. for 80 minutes to a Stage 2 viscosity at 25° C. of L (300 cs.).

(3) The second NaOH was added and reaction at 80° C. continued for 65 minutes to a Stage 3 viscosity at 25° C. of ZZ1 (2,485 cs.).

(4) The second water and third NaOH were added and the resin mixture held at 80° C. for another 50 minutes before cooling rapidly to room temperature to give a Stage 4 viscosity at 25° C. of W (1,070 cs.). This final resole resin contained about 40% total solids.

(B) Resin with HEC (2.5 MS) added to formaldehyde

To 348.5 parts of 46.5% formaldehyde was added 3.0 parts of a commercial hydroxyethyl cellulose having a hydroxyethyl MS of 2.5 and a 2% aqueous solution viscosity of 150–400 cps. at 25° C. After the HEC dissolved, the phenol and first water were added and the temperature adjusted to 25° C. Then the first NaOH was added and the mixture reacted using the same temperature schedule as Example 1A with the same additions of water and caustic at the end of each stage, e.g.

| Stage | 1 | 2 | 3 | 4 |
|---|---|---|---|---|
| Cook time, minutes | 110 | 80 | 80 | 45 |
| Final viscosity, 25° C | I | X | $Z_5Z_6$ | Z |

(C) Resin with HEC (0.4 MS) added to formaldehyde

To 324 parts of 50% formaldehyde was added 3.0 parts of a commercial hydroxyethyl cellulose having a hydroxyethyl MS of 0.4 and a 5% viscosity in 7% NaOH of 3160 cps. at 25° C. After blending 15 min., the phenol and first water were added and the temperature adjusted to 25° C. Then the first NaOH was added and the resin cooked as in Example 1A.

| Stage | 1 | 2 | 3 | 4 |
|---|---|---|---|---|
| Cook time, minutes | 110 | 80 | 65 | 50 |
| Final viscosity, 25° C | RS | XY | $Z_5Z_6$ | $Z_1Z_2$ |

(D) Resin with HEC (2.5 MS) added to phenol

A mixture of 308.4 parts of 91.4% phenol and 3.0 parts of the HEC of Example 1B was blended for 1 hour. Then the formaldehyde and first water were added and the temperature adjusted to 25° C. before adding the first NaOH and reacting using the temperature schedule of Example 1A.

| Stage | 1 | 2 | 3 | 4 |
|---|---|---|---|---|
| Cook time, minutes | 107 | 23 | 58 | 42 |
| Final viscosity, 25° C | H | VW | $Z_3Z_4$ | $ZZ_1$ |

Note the more rapid viscosity build reflected in the shorter reaction time at Stage 2.

(E) Resin with HEC (2.5 MS) added to NaOH

A mixture of 3.0 parts of the HEC of Example 1B, 25.4 parts 50% NaOH and 88.7 parts water was stirred for 1 hour in the reactor. Then the formaldehyde and phenol were added, the temperature adjusted to 25° C., and heating to 85° C. begun using the reaction schedule of Example 1A.

| Stage | 1 | 2 | 3 | 4 |
|---|---|---|---|---|
| Cook time, minutes | 115 | 85 | 63 | 47 |
| Final viscosity, 25° C | H | VWW | $Z_3Z_4$ | YZZ |

EXAMPLE 2

Plywood glue formulations (A) A mixture of 16.28 parts water, 0.58 part diesel oil antifoam agent, 3.18 parts of 50% NaOH, 0.58 parts soda ash, 14.53 parts of the adhesive resole resin (40% solids) and 12.97 parts of finely divided inert filler (Norprofil, Northwest Processing Corp., Tacoma, Wash.) was blended for 20 minutes at room temperature. Then an additional 48.57 parts of resole resin and 3.31 parts of water were added, and stirred for five minutes to yield 100.00 parts of plywood glue containing about 25.3% adhesive resin solids and about 41.0% total glue solids.

(B) The glue formulation of Example 2A was modified by adding 0.16 part of HEC (2.5 MS; 150–400 cps., 2%, 25° C.) premixed with the diesel oil antifoam agent to give a glue containing about 41.1% total glue solids.

EXAMPLE 3

Southern yellow pine plywood tests

The extreme porosity and absorptivity of the spring wood portions of Southern yellow pine veneers provide a very demanding test of glue performance. To measure the tolerance of the resole adhesive glues with Southern yellow pine veneers under extreme assembly conditions, the following test conditions were chosen:

T-1 wet veneer (7.5–8.0% $H_2O$), 5 min. assembly
T-2 med. veneer (4.0–5.0% $H_2O$), 15 min. assembly
T-3 dry veneer (2.4–3.5% $H_2O$), 60 min. assembly The conditions of T-1 promote high glue flow while high glue dry out occurs in T-3. The conditions of T-2 are about optimum for the Southern yellow pine test veneers.

The plywood test panels were prepared using three ⅛ Southern yellow pine veneers with an adhesive spread at 67–71 lbs./Mft.² of double glue line. The assembled ⅜" plywood panels were pressed two per opening at 140° C. (285° F.) and 200 p.s.i. for nine minutes and then hot-stacked overnight. Standard shear chips were cut and subjected to the vacuum-pressure treatment specified by the American Plywood Association (Paragraph 4.4.2 of PS 1–66, U.S. Product Standard for Softwood Plywood). Test results are expressed conventionally as percent wood failure with a high percent wood failure indicating superior glue line strength.

(A) Table 3A gives typical results with resole resins 1A, 1B and 1C formulated as described in Example 2A.

TABLE 3A.—HEC-FORMALDEHYDE RESOLE RESINS IN GLUE 2A

| Test | Resole resin | Assembly conditions, percent | | |
|---|---|---|---|---|
| | | T-1 | T-2 | T-3 |
| 3A-1 | 1A, no HEC | 34 | 84 | 79 |
| 3A-2 | 1B, 1.85% HEC (2.5 MS) | 73 | 93 | 64 |
| 3A-3 | 1C, 1.85% HEC (0.4 MS) | 76 | 95 | 63 |

Note the significantly higher wood failure with the glues containing HEC, particularly under conditions of high glue flow with a wet veneer and short assembly time (T-1). No significant difference is observed in these tests between the resins prepared with 0.4 and 2.5 MS hydroxyethyl cellulose.

(B) Table 3B gives similar data with glues prepared from the resole resins of Example 1 formulated as described in Example 2B with additional HEC added to the glue formulation as a thickener.

TABLE 3B.—HEC-FORMALDEHYDE RESOLE RESINS IN GLUE 2B

| Test | Resole resin | Assembly conditions, percent | | |
|---|---|---|---|---|
| | | T-1 | T-2 | T-3 |
| 3B-1 | 1A, no HEC | 64 | 92 | 80 |
| 3B-2 | 1B, 1.85% HEC (2.5 MS) | 86 | 95 | 78 |
| 3B-3 | 1C, 1.85% HEC (0.4 MS) | 88 | 93 | 76 |

The superiority of the resins containing HEC premixed with the formaldehyde is again apparent. Also note that use of additional HEC in glue formation 2B gives a significant further improvement in tolerance to both extreme test conditions.

(C) The surprising criticality of the mode of HEC addition is seen in Table 3C using resins prepared with 2.5 MS HEC.

TABLE 3C.—MODE OF HEC ADDITION (GLUE 2B)

| Test | Resole resin | Assembly conditions, percent | | |
|---|---|---|---|---|
| | | T-1 | T-2 | T-3 |
| 3C-1 | 1B, HEC plus HCHO | 86 | 95 | 78 |
| 3C-2 | 1D, HEC plus phenol | 54 | 93 | 12 |
| C-3 | 1E, HEC plus NaOH | 46 | 90 | 38 |

The improved wood and process tolerance of the resole resins prepared from the HEC-formaldehyde adduct or complex shown above can be obtained with other resole formulas and glue formulations.

EXAMPLE 4

GPC analysis of resole resins

Evidence such as shown in Example 3 of the superior performance of plywood glues prepared from a resole resin using a premixed HEC-formaldehyde reactant led to a study of the improved resole resins. The presence of higher molecular weight species was suggested by filtration tests and confirmed by gel permeation chromatography (GPC) using a 10⁴ A., "Styrogel" column (Water's Associates, Framingham, Mass.). This column fractionated 1% dimethylformamide solutions of phenol-formaldehyde resins by excluding species with a molecular weight greater than about 1300 and strongly sorbing species of a molecular weight below about 400, thus giving a molecular weight profile for the resole resin.

Samples of resole resins 1A–1E were freeze-dried and then dissolved in dimethylformamide as 1 wt. percent solutions. Typical elution profiles are given in Table 4 in terms of the GPC peak area ratios for the high, medium and low MW fractions. The significant increase in higher MW fraction from premixing the HEC and HCHO is evident. It is the same resole resins which in a standard plywood glue formulation show enhanced tolerance to wood species and process variations.

TABLE 4.—GPC ANALYSIS LF RESOLE RESINS

| Resole resin | Relative peak areas | | |
|---|---|---|---|
| | High MW/ total | High MW/ med. MW | Med. MW/ low MW |
| 1B, HEC plus HCHO | 0.044 | 0.40 | 2.0 |
| 1D, HEC plus phenol | 0.031 | 0.21 | 2.0 |
| 1E, HEC plus NaOH | 0.031 | 0.29 | 2.2 |
| 4B,¹ HEC plus HCHO | 0.080 | 0.71 | 1.9 |
| 4D,¹ HEC plus phenol | 0.063 | 0.48 | 1.9 |
| 4E,¹ HEC plus NaOH | 0.049 | 0.33 | 1.6 |

¹ Prepared as in Example 1 with final Stage 4 viscosity of $ZZ_1$.

EXAMPLE 5

Comparison with Barrentine resin

Further evidence of a critical mode of HEC addition is given in Table 5A comparing the premixed HEC-formaldehyde resin 1B with the prior art HEC adhesive resin of Barrentine, U.S. Pat. 2,862,897. Resin was prepared as described in Barrentine Example I when the HEC is premixed with NaOH and then reacted with formaldehyde and phenol. The HEC was a 0.4 MS product having a viscosity of 3160 cps. at 25° C. when 5% by weight was dissolved in 7% NaOH. This resin 5A was incorporated into the glue mix of Barrentine Example III, which is similar to glue 2A above. Test panels were prepared as described in Example 3 of this specification, again using Southern yellow pine veneer at three moisture levels and three closed assembly times.

The performance of the Barrentine adhesive is compared with a replication of the resin and glue mix of Test 3B-2 in the table below.

TABLE 5A.—TEST WITH SOUTHERN YELLOW PINE VENEERS

| Test | Resole resin | Assembly conditions, percent | | |
|---|---|---|---|---|
| | | Wet, 5 min. | Med., 15 min. | Dry, 30 min. |
| 5A-1 | 1B, HEC (2.5 MS) plus HCHO | 68 | 95 | 96 |
| 5A-2 | 5A,¹ HEC (0.4 MS) plus NaOH | 36 | 83 | 96 |

¹ Prepared as in Barrentine Example I.

These tests confirm the improved performance of the present HEC-formaldehyde resins over the prior art resins when called upon for use under the adverse assembly time and veneer moisture content conditions frequently encountered in a modern plywood plant. In addition to the excellent strength of glues based on HEC-formaldehyde resole resins when used under the demanding conditions imposed by Southern pine, superior performance has also been found on Douglas fir and other woods.

We claim:

1. In a process for preparing a thermosetting phenol-formaldehyde adhesive resole given by reaction of phenol and formaldehyde in the presence of alkali, the improvement which comprises:
   (A) Premixing, in the absence of alkali, aqueous formaldehyde and about 0.3–6.0 wt. percent hydroxyethyl cellulose based on formaldehyde, and thereafter.
   (B) Reacting the aqueous hydroxyethyl cellulose formaldehyde solution with phenol in the presence of alkali to obtain an improved thermosetting phenol-formaldehyde adhesive resin.

2. The process of claim 1 where the hydroxyethyl cellulose has a viscosity of about 40–4000 cps. as a 2% aqueous solution at 25° C.

3. The process of claim 1 where the hydroxyethyl cellulose is water-soluble and has a hydroxyethyl molar substitution of about 1.2–4.0.

4. The process of claim 1 where about 1.5–3.0 wt. percent of a water-soluble hydroxyethyl cellulose having a 2 wt. percent aqueous solution viscosity of about 40–4000 cps. at 25° C. is premixed with about 30–60% aqueous formaldehyde.

5. The process of claim 1 where the reactant mole ratios of formaldehyde/alkali/phenol are about 1.5–2.5/0.1–0.7/1.0.

6. The process of claim 4 where the premixed hydroxyethyl cellulose-formaldehyde solution is reacted with phenol in the presence of sodium hydroxide at about 70°–100° C. in a ratio of about 1.7–2.0 moles formaldehyde/mole phenol.

7. A thermosetting phenol-formaldehyde adhesive resole resin prepared by reacting:
(A) An aqueous 30–60% formaldehyde solution premixed, in the absence of alkali, with about 0.3–6.0 wt. percent hydroxyethyl cellulose based on formaldehyde,
(B) Phenol, and
(C) A strong alkali
in reactant mole ratios of formaldehyde/alkali/phenol of about 1.5–2.5/0.1–0.7/1.0.

8. The phenol-formaldehyde adhesive resin of claim 7 where the hydroxyethyl cellulose is water-soluble with a hydroxyethyl molar substitution of about 1.2–4.0 and a 2 wt. percent aqueous solution viscosity of 40–4000 cps.

9. A thermosetting phenol-formaldehyde adhesive glue suitable for plywood manufacture wherein the adhesive resin is the phenol-formaldehyde resole resin of claim 7.

10. The adhesive glue of claim 9 containing about 20–50 wt. percent of the phenol-formaldehyde resole resin solids and about 35–65 wt. percent total solids.

References Cited
UNITED STATES PATENTS

| | | | |
|---|---|---|---|
| 2,862,897 | 12/1958 | Barrentine et al. | 260—14 |
| 2,613,167 | 10/1952 | Cone | 260—14 |

FOREIGN PATENTS

| | | | |
|---|---|---|---|
| 461,522 | 11/1949 | Canada | 260—14 |

HAROLD D. ANDERSON, Primary Examiner

E. WOODBERRY, Assistant Examiner